No. 861,457. PATENTED JULY 30, 1907.
J. R. GOLDEN.
TRACTION WHEEL.
APPLICATION FILED JAN. 26, 1906.
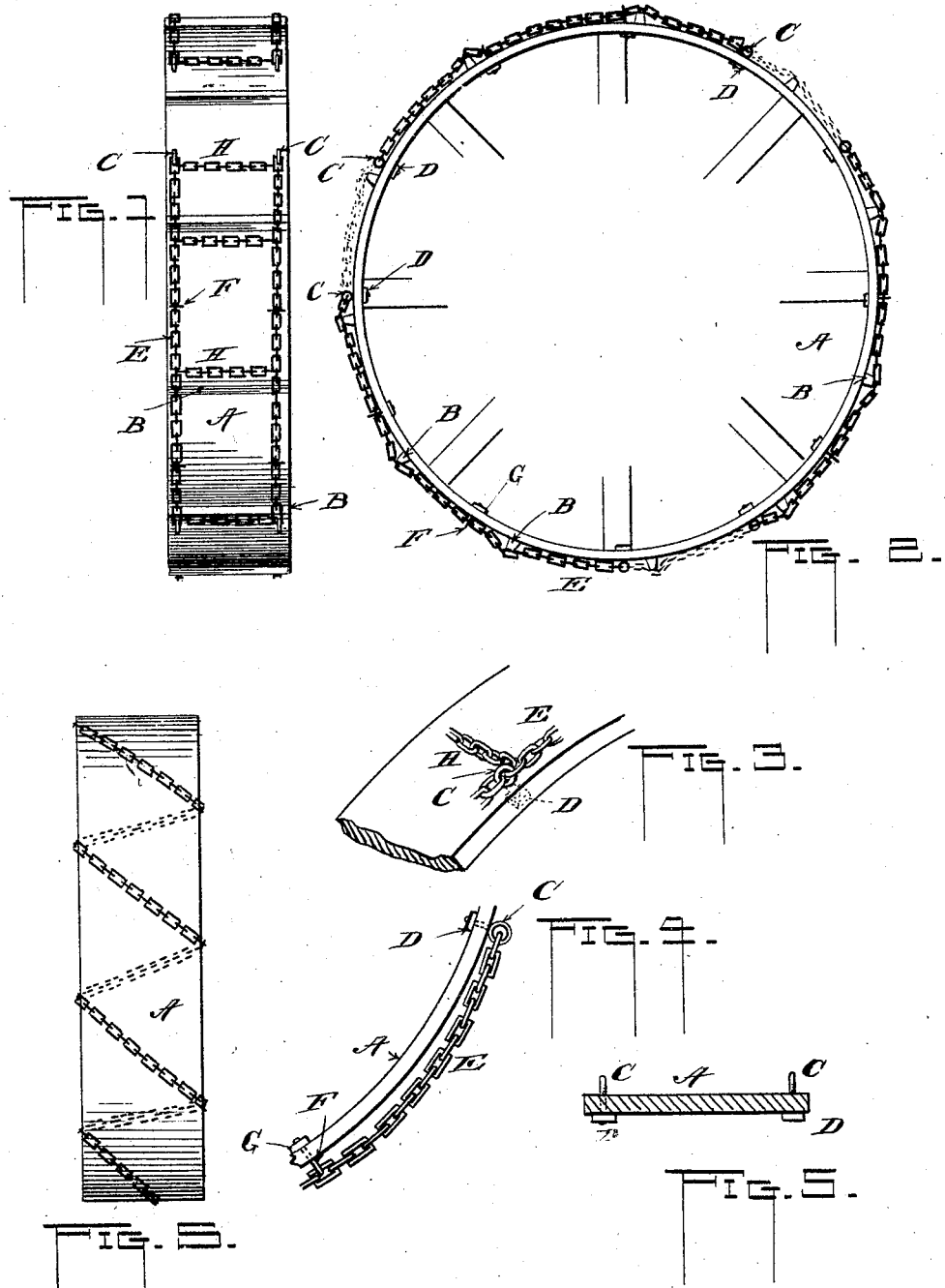
Witnesses:
Inventor:
John R. Golden,
By L. N. Thurlow,
Atty.

UNITED STATES PATENT OFFICE.

JOHN R. GOLDEN, OF SPRING LAKE TOWNSHIP, TAZEWELL COUNTY, ILLINOIS.

TRACTION-WHEEL.

No. 861,457.   Specification of Letters Patent.   Patented July 30, 1907.

Application filed January 26, 1906. Serial No. 297,981.

*To all whom it may concern:*

Be it known that I, JOHN R. GOLDEN, a citizen of the United States, residing in Spring Lake township, in the county of Tazewell and State of Illinois, have invented certain new and useful Improvements in Traction-Wheels; and I do hereby declare that the following is a full, clear, and exact description of the invention, which will enable others skilled in the art to which it appertains to make and use the same.

This invention pertains to means for attachment to the wheels of traction engines, and other self propelled vehicles, for preventing them from slipping.

The object of the invention is to provide means for attachment to a traction wheel whereby said wheel is prevented from slipping whether on icy surfaces or muddy slippery roads.

A further object is to provide means for attachment to any wheel for the purposes described.

A further object is to furnish a peculiar non-skipping means for the face of a traction wheel which will be loose and capable of discharging mud and dirt collected thereon.

In the appended drawing, Figure 1 is a face view of a wheel showing one form of my improved means attached thereto. Fig. 2 is a side elevation of a wheel showing the invention as illustrated in Fig. 1. Fig. 3 is a perspective view of a portion of the rim of a wheel showing a portion of my invention. Fig. 4 is a section of a wheel rim showing my means attached thereto and its loose action when in use. Fig. 5 is a cross section of a wheel rim showing two eyes secured therein. Fig. 6 is a face view of a wheel showing another arrangement of my invention thereon.

In the figures the reference letter A indicates the rim of a traction wheel of the kind usually employed for traction engines, and having the lugs B on its face. Those familiar with traction engines and those who have had experience with these implements are well acquainted with the difficulties encountered in traversing muddy or icy surfaces in that the wheels continually slip on such surfaces regardless of the lugs usually employed. It is my purpose in view of this to provide a quite simple but effective attachment for the wheel which consists, as shown in the figures, of chain sections. These said sections have shown applied in three places on the surface of the rim although they may extend entirely around in an unbroken line.

At C are represented eye-bolts held in the rim by means of nuts D inside the latter as will be understood. These are spaced apart in pairs in such manner that each widely separated pair has connected to them a length of chain indicated by E. Said eye-bolts are placed near each edge of the rim so as to provide for the latter a stretch of chain near each said edge as shown in Fig. 1. At F are other eye-bolts held in the rim by nuts G, these being preferably spaced apart evenly between the eye-bolts C described. Connecting the several parallel stretches of chain thus provided are transverse short lengths of chains at intervals as represented by the letter H.

It will be seen that the chains are perfectly loose between the several eye-bolts and that they will shake and hang loosely at all times even throughout their entire lengths, this being also true of the transverse chain portions. In use the chains cut into icy surfaces or enter through the mud to a firm foundation and thus find a hard gripping surface in the ground and as they are carried around the wheel their looseness and weight cause them to shake and vibrate and thus free themselves of the dirt adhering thereto or that has been forced inside the links. Fig. 4 shows how the chains hang outward from the wheel rim as they approach the road surface at which time they free themselves as stated. When the wheels have stood after use and the mud dries or freezes, one revolution of the wheel is sufficient to fully free the chains of their load since when the weight of the wheel is put upon the chains the links are individually loosened and shaken and the dirt and ice broken and crushed with the result that said chains are perfectly cleared. In the ordinary wheel the mud packs each side of the lugs and finally fills in the spaces between them entirely so that the wheel is rendered useless in a very short time whereas is using the chains the wheel is kept clear at all times it being impossible to clog them for the reason stated. The advantage of my device is that any wheel can be readily and quickly fitted with the chains by placing them in position either by the means stated or any other that may come into the mind of the mechanic as the best way of attaching or applying them.

I do not wish to confine myself to any particular form of chain or the arrangement thereof on the wheel nor, indeed, to the particular mode of fastening them in place, the main object being to have a flexible or loosely attached member such as a chain or even a cable which can free itself of all accumulations through its ability to vibrate or flex. In Fig. 6 is shown a method of applying the chain to a wheel in which said chain is merely wrapped in and out around the rim in a manner to cause the stretches on the face of the wheel to traverse the said face in diagonal lines as shown. As before stated the chains, Fig. 2, may extend entirely around the rim as indicated in dotted lines in that figure.

In using my invention upon a wheel rim when the usual ribs are not present, the constant jarring and jolting is entirely lacking whereas in using the said ribs as in common practice the jarring due thereto is annoying and causes much discomfort besides being useless for the purpose for which they are intended.

I claim:

1. An attachment for a traction wheel for the purposes set forth comprising lengths of loosely connected members, the ends of such lengths being secured to the face or tread of the wheel, the portions between their ends being slack and free to vibrate substantially as described.

2. An attachment for a traction wheel for the purposes set forth, comprising lengths of loosely connected members, the lengths being secured at their ends to the face of the wheel but free to vibrate between their ends, the members thereof having relative movement.

3. An attachment for a traction wheel comprising a series of loosely connected members formed in lengths, the same lying upon the wheel face or tread, and means for attaching the ends of the lengths to the wheel, the members between the secured ends being free to move relatively and relatively to the wheel face substantially in the manner described.

4. An attachment for a traction wheel comprising a series of members loosely jointed at intervals such members having connection at their ends with the wheel, and means for securing their ends to the wheel, the members being longer than the distance between their places of attachment to the wheel to leave them slack between their ends and free to vibrate for the purposes set forth.

5. An attachment for traction wheels consisting of members adapted to flex and positioned upon the tread of the wheel, and means for securing their ends thereto, said members being substantially straight between their ends and longer than the shortest distance between their places of attachment to permit them to loosely shake to liberate dirt held thereby.

6. An attachment for traction wheels for preventing them from slipping consisting of members adapted to flex and constructed in lengths and secured permanently upon the wheel tread and means for securing their ends to the wheel, the members between their connected ends being longer than the distance between the places of attachment to the wheel for permitting the members to shake and vibrate freely and to roll and rock loosely beneath the wheel when in contact with the ground.

7. In an attachment for traction wheels, members adapted to flex and constructed in lengths and stationed permanently upon the wheel tread substantially concentric with the circumference thereof, and means for attaching the lengths to the wheel face at intervals, the measurement of the lengths being greater than the measurement between the points of attachment thereof measured along said lengths.

8. In attachments for traction wheels a series of members constructed in lengths, means for attaching them permanently at intervals upon the wheel tread substantially concentric with the circumference thereof, such members adapted to hang loosely and free to rock and vibrate at and between their places of attachment for the purposes set forth.

9. In an attachment for traction wheels, members adapted to flex and arranged in lengths upon the wheel tread, and means for securing them at their ends and at intervals between said ends to said wheel tread or face and arranged thereupon substantially parallel to the plane of the wheel, the lengths being longer between their several points of attachment than the distance between the several securing means for the purposes stated.

10. The combination with the face or tread of a traction wheel, of chains secured on said tread substantially parallel to the plane of the wheel, means by which they are secured to the wheel, said chains being permitted to be loose between the securing means to adapt them for shaking and vibrating between the securing means and for adapting them also for hanging away from the wheel face as described.

11. The combination with the face or tread of a traction wheel, of chains carried thereon, means for securing the chains thereon, and from which they loosely hang substantially as described.

12. The combination with the tread of a traction wheel, of pairs of substantially parallel chains carried on said tread as shown, means for securing them to the tread at intervals substantially as described, and lateral substantially straight chains connecting them and extending across the tread substantially at right angles to the said pairs of chains.

In testimony whereof I affix my signature, in presence of two witnesses.

JOHN R. GOLDEN.

Witnesses:
ISAAC TAYLOR,
W. H. PAUL.